US012764508B2

(12) United States Patent
Tran et al.

(10) Patent No.: US 12,764,508 B2
(45) Date of Patent: Oct. 13, 2026

(54) METHOD TO AUTOMATICALLY REPROVISION A VEHICLE'S ROAMING POLICY WHEN TRACKING A STOLEN VEHICLE

(71) Applicant: GM Global Technology Operations LLC, Detroit, MI (US)

(72) Inventors: Benjamin Tran, Royal Oak, MI (US); James Doherty, Detroit, MI (US); Russell A. Patenaude, Macomb Township, MI (US); Scott Thomas Droste, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 426 days.

(21) Appl. No.: 18/482,948

(22) Filed: Oct. 9, 2023

(65) Prior Publication Data

US 2025/0119714 A1 Apr. 10, 2025

(51) Int. Cl.
*H04W 4/44* (2018.01)
*H04W 4/02* (2018.01)
*H04W 4/021* (2018.01)
*H04W 4/029* (2018.01)

(52) U.S. Cl.
CPC ............. *H04W 4/44* (2018.02); *H04W 4/021* (2013.01); *H04W 4/025* (2013.01); *H04W 4/029* (2018.02)

(58) Field of Classification Search
CPC ..... H04W 4/021; H04W 4/025; H04W 4/029; H04W 4/44
USPC ........................................................ 455/456.1
See application file for complete search history.

(56) References Cited

U.S. PATENT DOCUMENTS

| | | | | |
|---|---|---|---|---|
| 11,076,342 B1 * | 7/2021 | Strand | H04W 76/18 | |
| 2010/0279690 A1 * | 11/2010 | Buckley | H04W 8/18 | 455/435.2 |
| 2011/0039559 A1 * | 2/2011 | Yi | H04W 48/18 | 455/435.2 |
| 2012/0044869 A1 | 2/2012 | Tiwari | | |
| 2013/0308470 A1 * | 11/2013 | Bevan | H04W 16/28 | 370/252 |

(Continued)

FOREIGN PATENT DOCUMENTS

CA 2694036 A1 8/2010

*Primary Examiner* — Jean A Gelin
(74) *Attorney, Agent, or Firm* — Honigman LLP; Matthew H. Szalach

(57) ABSTRACT

A method includes transmitting a first wireless communication from a user device via an authorized first cellular network. The first wireless communication includes a current geographic location of the user device. The user device maintains a forbidden list identifying unauthorized cellular networks. Based on determining that the user device is approaching a geofence between a first network coverage area of the first cellular network and a second network coverage area of a second cellular network that is identified on the forbidden list, the method includes removing the second cellular network from the forbidden list. With the second cellular network removed from the forbidden list and based on the user device entering the second network coverage area, the method includes transmitting a second wireless communication from the user device via the second cellular network that includes an updated geographic location of the user device.

20 Claims, 7 Drawing Sheets

(56) References Cited

U.S. PATENT DOCUMENTS

| | | | | |
|---|---|---|---|---|
| 2014/0235238 | A1* | 8/2014 | Pais | H04W 76/23 455/434 |
| 2015/0334545 | A1* | 11/2015 | Maier | H04W 64/00 455/404.2 |
| 2016/0029342 | A1* | 1/2016 | Winand | H04W 4/023 455/573 |
| 2016/0285766 | A1* | 9/2016 | Gottlib | H04L 45/123 |
| 2017/0374568 | A1* | 12/2017 | Heath | H04W 24/02 |
| 2018/0262903 | A1* | 9/2018 | Ryan | H04W 4/021 |
| 2019/0320384 | A1* | 10/2019 | Tillgren | H04W 4/029 |
| 2020/0219401 | A1* | 7/2020 | Ren | H04W 4/021 |
| 2021/0212017 | A1* | 7/2021 | Bevan | H04W 16/28 |
| 2021/0250725 | A1 | 8/2021 | Balasubramanian et al. | |
| 2022/0141637 | A1* | 5/2022 | Pellegrini | H04W 4/90 455/404.1 |
| 2024/0031913 | A1* | 1/2024 | Grießbach | H04W 8/183 |
| 2024/0169768 | A1* | 5/2024 | Borras | G07B 15/063 |
| 2024/0214881 | A1* | 6/2024 | Nam | H04W 36/0055 |
| 2024/0236709 | A1* | 7/2024 | Khalid | H04W 24/02 |

* cited by examiner

METHOD TO AUTOMATICALLY REPROVISION A VEHICLE'S ROAMING POLICY WHEN TRACKING A STOLEN VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to reprovisioning or updating a vehicle's cellular communication roaming policy, and more specifically to automatically reprovisioning a stolen vehicle's communication protocol to enable roaming before the stolen vehicle travels into the coverage area of a roaming network.

When a vehicle is in a tracking or theft monitoring state, the vehicle transmits its geographic location via a cellular network to a central control or monitoring entity so that the monitoring entity may track and recover the stolen vehicle. However, vehicles are commonly provisioned with communication protocols that prohibit roaming usage of cellular networks outside of the vehicle's home network. Thus, if a stolen vehicle travels into a roaming territory where the vehicle is not authorized to communicate via the cellular network, the vehicle is unable to transmit its geographic location and the monitoring entity is unable to continue tracking the stolen vehicle.

In order to continue tracking the stolen vehicle after it travels into roaming territory, the vehicle's communication protocol is reprovisioned to enable roaming communication via a roaming cellular network when it is determined that the stolen vehicle is traveling within an active coverage territory toward the roaming territory.

SUMMARY

An aspect of the disclosure provides a computer-implemented method that, when executed by data processing hardware, causes the data processing hardware to perform operations. The operations include transmitting a first wireless communication from a user device via a first cellular network. The first wireless communication includes a current geographic location of the user device. The first cellular network includes an authorized cellular network that the user device is authorized to use for wireless communications. The user device maintains a forbidden list identifying one or more cellular networks that the user device is not authorized to use for wireless communications. The operations include determining, based on the current geographic location of the user device, that the user device is approaching a geofence. The geofence includes a geographic boundary between a first network coverage area of the first cellular network and a second network coverage area of a second cellular network. The second cellular network is identified on the forbidden list. Based on the determination that the user device is approaching the geofence, the operations include removing the second cellular network from the forbidden list. With the second cellular network removed from the forbidden list and based on the user device entering the second network coverage area, the operations include transmitting a second wireless communication from the user device via the second cellular network. The second wireless communication includes an updated geographic location of the user device.

Implementations of the disclosure may include one or more of the following optional features. In some implementations, the operations further include, with the second cellular network removed from the forbidden list, receiving an operational instruction at the user device. The operational instruction is transmitted to the user device from a central system remote from the user device via the second cellular network. An operational parameter of the user device is adjusted based on the operational instruction.

In some examples, removing the second cellular network from the forbidden list includes transmitting instructions from a central system via the first cellular network for the user device to clear the forbidden list. The central system is remote from the user device.

In some aspects, the operations further include, with the second cellular network identified on the forbidden list and based on the user device entering the second network coverage area, attempting to transmit the second wireless communication from the user device via at least one of the first cellular network and the second cellular network. In further aspects, attempting to transmit the second wireless communication from the user device includes a threshold waiting period between respective attempts to transmit the second wireless communication. The threshold waiting period is reduced based on a tracking state associated with the user device.

In some implementations, determining that the user device is approaching the geofence is further based on at least one of a distance between the user device and the geofence, a directional heading of the user device, and a velocity of the user device. Optionally, the user device includes a vehicle.

Another aspect of the disclosure provides a system. The system includes data processing hardware and memory hardware in communication with the data processing hardware. The memory hardware stores instructions executed on the data processing hardware that cause the data processing hardware to perform operations. The operations include transmitting a first wireless communication from a user device via a first cellular network. The first wireless communication includes a current geographic location of the user device. The first cellular network includes an authorized cellular network that the user device is authorized to use for wireless communications. The user device maintains a forbidden list identifying one or more cellular networks that the user device is not authorized to use for wireless communications. The operations include determining, based on the current geographic location of the user device, that the user device is approaching a geofence. The geofence includes a geographic boundary between a first network coverage area of the first cellular network and a second network coverage area of a second cellular network. The second cellular network is identified on the forbidden list. Based on the determination that the user device is approaching the geofence, the operations include removing the second cellular network from the forbidden list. With the second cellular network removed from the forbidden list and based on the user device entering the second network coverage area, the operations include transmitting a second wireless communication from the user device via the second cellular network. The second wireless communication includes an updated geographic location of the user device. Implementations of this disclosure may include one or more of the following optional features.

In some implementations, the operations further include, with the second cellular network removed from the forbidden list, receiving an operational instruction at the user device. The operational instruction is transmitted to the user device from a central system remote from the user device via the second cellular network. An operational parameter of the user device is adjusted based on the operational instruction.

In some examples, removing the second cellular network from the forbidden list includes transmitting instructions from a central system via the first cellular network for the user device to clear the forbidden list. The central system is remote from the user device.

In some aspects, the operations further include, with the second cellular network identified on the forbidden list and based on the user device entering the second network coverage area, attempting to transmit the second wireless communication from the user device via at least one of the first cellular network and the second cellular network. In further aspects, attempting to transmit the second wireless communication from the user device includes a threshold waiting period between respective attempts to transmit the second wireless communication. The threshold waiting period is reduced based on a tracking state associated with the user device.

In some implementations, determining that the user device is approaching the geofence is further based on at least one of a distance between the user device and the geofence, a directional heading of the user device, and a velocity of the user device. Optionally, the user device includes a vehicle.

Yet another aspect of the disclosure provides a vehicle. The vehicle includes data processing hardware and memory hardware in communication with the data processing hardware. The memory hardware stores instructions executed on the data processing hardware that cause the data processing hardware to perform operations. The operations include transmitting a first wireless communication from the vehicle via a first cellular network. The first wireless communication includes a current geographic location of the vehicle. The first cellular network includes an authorized cellular network that the vehicle is authorized to use for wireless communications. The vehicle maintains a forbidden list identifying one or more cellular networks that the vehicle is not authorized to use for wireless communications. The operations include determining, based on the current geographic location of the vehicle, that the vehicle is approaching a geofence. The geofence includes a geographic boundary between a first network coverage area of the first cellular network and a second network coverage area of a second cellular network. The second cellular network is identified on the forbidden list. Based on the determination that the vehicle is approaching the geofence, the operations include removing the second cellular network from the forbidden list. With the second cellular network removed from the forbidden list and based on the vehicle entering the second network coverage area, the operations include transmitting a second wireless communication from the vehicle via the second cellular network. The second wireless communication includes an updated geographic location of the vehicle. Implementations of this disclosure may include one or more of the following optional features.

In some implementations, the operations further include, with the second cellular network removed from the forbidden list, receiving an operational instruction at the vehicle. The operational instruction is transmitted to the vehicle from a central system remote from the vehicle via the second cellular network. An operational parameter of the vehicle is adjusted based on the operational instruction.

In some examples, removing the second cellular network from the forbidden list includes transmitting instructions from a central system via the first cellular network for the vehicle to clear the forbidden list. The central system is remote from the vehicle.

In some aspects, the operations further include, with the second cellular network identified on the forbidden list and based on the vehicle entering the second network coverage area, attempting to transmit the second wireless communication from the vehicle via at least one of the first cellular network and the second cellular network. In further aspects, attempting to transmit the second wireless communication from the vehicle includes a threshold waiting period between respective attempts to transmit the second wireless communication. The threshold waiting period is reduced based on a tracking state associated with the vehicle.

In some implementations, determining that the vehicle is approaching the geofence is further based on at least one of a distance between the vehicle and the geofence, a directional heading of the vehicle, and a velocity of the vehicle.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
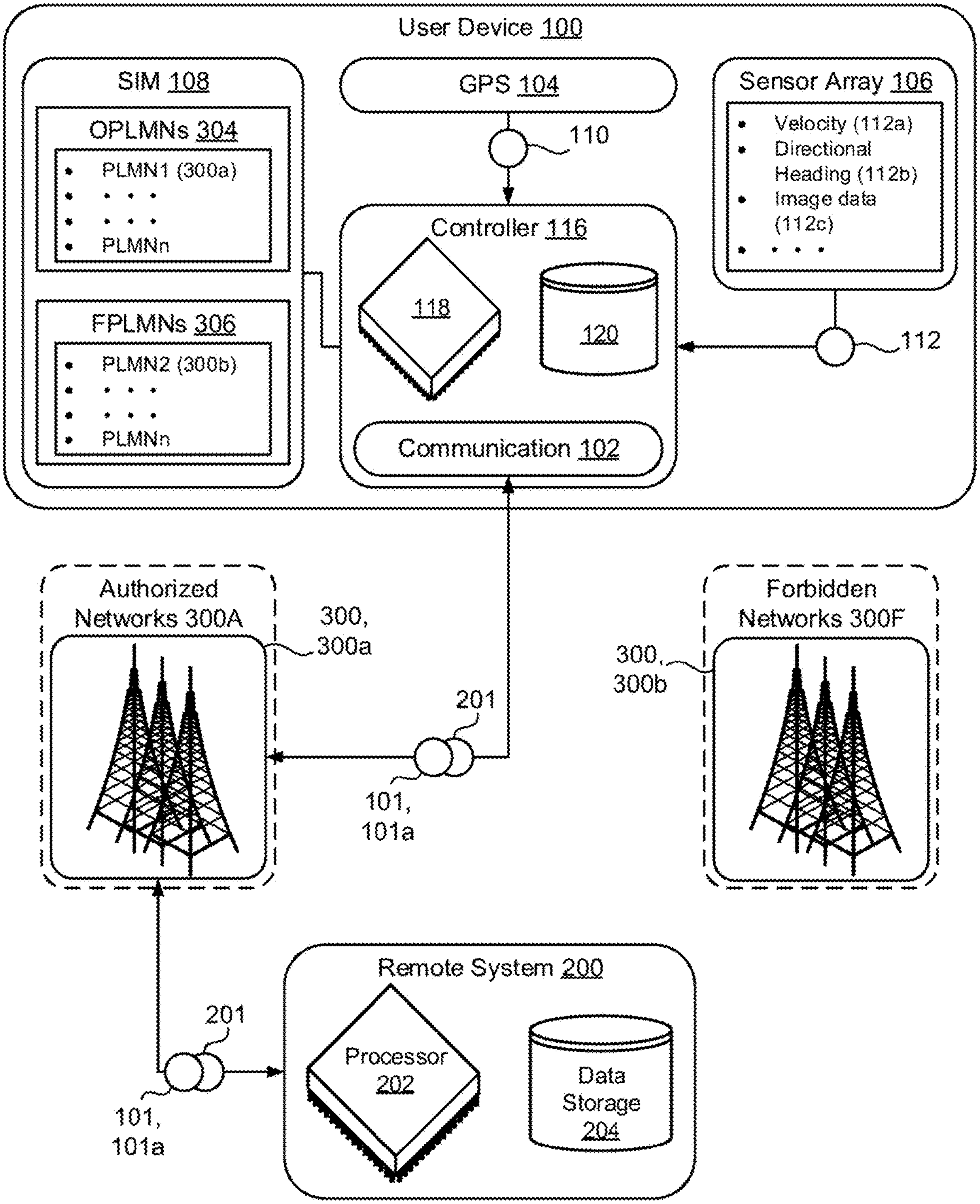
FIG. 1 is a schematic view of a user device wirelessly communicating with a central system remote from the user device via a first cellular network, where the communication protocols of the user device are not provisioned to enable roaming.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on." "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between." "adjacent" versus "directly adjacent," etc.). As used herein, the term "and/or" includes any and all combinations of one or more of the associated listed items.

The terms "first." "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below; the term "module" may be replaced with the term "circuit." The term "module" may refer to, be part of, or include an Application Specific Integrated Circuit (ASIC): a digital, analog, or mixed analog/digital discrete circuit: a digital, analog, or mixed analog/digital integrated circuit: a combinational logic circuit: a field programmable gate array (FPGA): a processor (shared, dedicated, or group) that executes code: memory (shared, dedicated, or group) that stores code executed by a processor: other suitable hardware components that provide the described functionality: or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry. e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well: for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Vehicles are often equipped with a communication module or telematics system that transmits and receives signals or communications via a cellular network, such as to enable data transfer and other communication between one or more onboard systems or controllers at the vehicle and a back office controller or central system remote from the vehicle. For example, the telematics system may transmit geographic locations of the vehicle (e.g., as determined by a global positioning system (GPS) module at the vehicle) to the central system and the central system may transmit instructions related to operating system updates to the onboard systems. Typically, vehicular communication modules are not provisioned for roaming and thus connection between the onboard systems at the vehicle and the central system is lost when the vehicle travels outside of network coverage areas provided by authorized cellular networks and into network coverage areas provided by unauthorized or roaming cellular networks. Among other shortcomings, losing connectivity between the central system and the vehicle results in an inability to inform the central system of the geographic location of the vehicle and an inability for the central system to communicate instructions to the vehicle, such as to enable or disable operation of the engine or powertrain system of the vehicle, to enable or disable operation of the ignition system of the vehicle, to operate exterior lighting systems of the vehicle (e.g., to flash headlights or emergency lights of the vehicle), to unlock or lock doors of the vehicle, and the like.

For example, a common problem that arises in regions near international borders, such as along the border between the United States and Mexico, is vehicles being stolen and driven across the international border, such as from the United States into Mexico. Because vehicles with communication protocols are often not provisioned with roaming enabled in neighboring nations (e.g., vehicles registered in the United States do not have roaming enabled in Mexico), the stolen vehicle loses connectivity after the stolen vehicle travels across the border into the neighboring nation and the stolen vehicle is unable to transmit its geographic location for tracking and recovery of the vehicle.

As discussed further below, the present disclosure allows user devices to retain connectivity when travelling between a network coverage area of an authorized cellular network and a network coverage area of an unauthorized or roaming cellular network by automating a process that reprovisions communication protocols of the user device to enable roaming when the user device is determined to be approaching a boundary of the network coverage area of the authorized cellular network. Thus, when the user device travels from the network coverage area of the authorized cellular network into the network coverage area of the roaming cellular network, the user device connects to the roaming cellular network and communicates with the central system via the roaming cellular network. Although discussed herein as relating to vehicles with communication protocols, it should be understood that the system and methods discussed herein are applicable to any suitable user device that communicates via cellular networks, such as vehicles, mobile phones, laptops, and the like.

Referring to FIGS. 1-4, a user device or vehicle 100 includes a communication module or telematics system 102 configured to wirelessly communicate with a back office system or central system 200 remote from the user device 100. The communication module 102 wirelessly communicates with the central system 200 via one or more cellular networks or public land mobile networks (PLMNs) 300, such as to transmit information from one or more onboard systems of the user device 100 to the central system 200 and to receive instructions or system updates from the central system 200. For example, the user device 100 is equipped with a GPS module 104 that determines geographic locations 110 of the user device 100 and one or more sensors 106 that respectively capture sensor data 112 representative of conditions of the user device 100 or environmental conditions at the user device 100.

In the illustrated example of the vehicle 100, the one or more sensors 106 may capture sensor data 112 representative of velocity 112*a* of the vehicle 100, a direction of travel or directional heading 112*b* of the vehicle 100, fuel level of the vehicle 100, and the sensors 106 may capture image data 112*c* representative of areas interior or exterior the vehicle, and the like. Communications wirelessly transmitted from the communication module 102 of the vehicle 100 to the central system 200 via the cellular network 300 may include a geographic location 110 of the vehicle 100 and/or the captured sensor data 112.

A subscriber identity module (SIM) 108 identifies which cellular networks 300 the communication module 102 is authorized to use. Cellular networks 300 provide respective network coverage areas 302 that include geographic regions where the user device 100 is able to wirelessly connect to transmitters associated with the cellular network 300. Further, cellular networks 300 may be categorized as authorized cellular networks 300A that the user device 100 is authorized to use for wireless communications and as forbidden cellular networks 300F that the user device 100 is not authorized to use for wireless communications. For example, for a user device 100 registered in the United States, cellular networks 300 with network coverage areas 302 providing cellular connectivity to territory in the United States are categorized as authorized cellular networks 300A and cellular networks 300 with network coverage areas 302 providing cellular connectivity to territory outside the United States (e.g., Canada or Mexico) are categorized as forbidden cellular networks 300F. The SIM 108 maintains an authorized list or OPLMN list 304 identifying one or more authorized cellular networks 300A and a forbidden list or forbidden PLMN (FPLMN) list 306 identifying one or more forbidden cellular networks 300F.

Although the SIM 108 is shown at the user device 100, it should be understood that the SIM 108 and the authorized list 304 and forbidden list 306 may be maintained by the central system 200, where the central system 200 communicates with the cellular networks 300 to identify authorized cellular networks 300A and forbidden cellular networks 300F. The user device 100 may thus operate in an active scanning mode where the communication module 102 attempts to connect to any available or nearby cellular networks 300 and the connection is allowed or prohibited by the cellular network 300 based on whether the cellular network 300 is an authorized cellular network 300A or a forbidden cellular network 300F.

Thus, the user device 100 communicates with the remote system 200 via the one or more authorized cellular networks 300A that the user device 100 is authorized to use for wireless communications and the user device 100 is not provisioned to transmit wireless communications via the forbidden cellular networks 300F. That is, with the SIM 108 of the user device 100 maintaining the forbidden list 306 identifying one or more forbidden cellular networks 300F that the user device 100 is not authorized to use for wireless communications, the user device 100 does not attempt to transmit communications via cellular networks 300 identified on the forbidden list 306.

The central system 200 includes data processing hardware 202 and memory hardware 204 in communication with the data processing hardware 202. The memory hardware 204 stores instructions that, when executed on the data processing hardware 202, cause the data processing hardware 202 to perform operations. For example, the memory hardware 204 stores instructions for reprovisioning communication protocols managed by the SIM 108 of the user device 100 to enable roaming.

Further, the instructions for reprovisioning communication protocols of the user device 100 to enable roaming may be executed by a controller 116 of the user device 100. The controller 116 may accommodate the communication module 102 and further include data processing hardware 118 and memory hardware 120 in communication with the data processing hardware 118 and storing the instructions to be executed on the data processing hardware 118. Optionally, the instructions for reprovisioning the user device 100 are stored in memory hardware 204 of the central system 200 for executing on the data processing hardware 118 of the user device 100. As discussed further below, instructions for reprovisioning the communication protocols of the user device 100 to enable roaming are executed when the user device 100 is in a theft state or monitoring state (e.g., where the central system 200 is tracking the geographic location 110 of the user device) and it is determined that the user device 100 is approaching the boundary of authorized cellular networks 300A and may lose connectivity with the central system 200.

With the user device 100 communicatively connected to the central system 200 via an authorized cellular network 300A, the central system 200 tracks the geographic location 110 of the user device 100 based on wireless communications 101 received from the user device 100. For example, when the user device 100 is in the theft state or monitoring state, the communication module 102 transmits wireless communications 101 to the remote system 200 that include the geographic location 110 of the user device 100 so that the remote system 200 tracks the user device 100 for recovery or interception of the user device 100.

Figure 3:
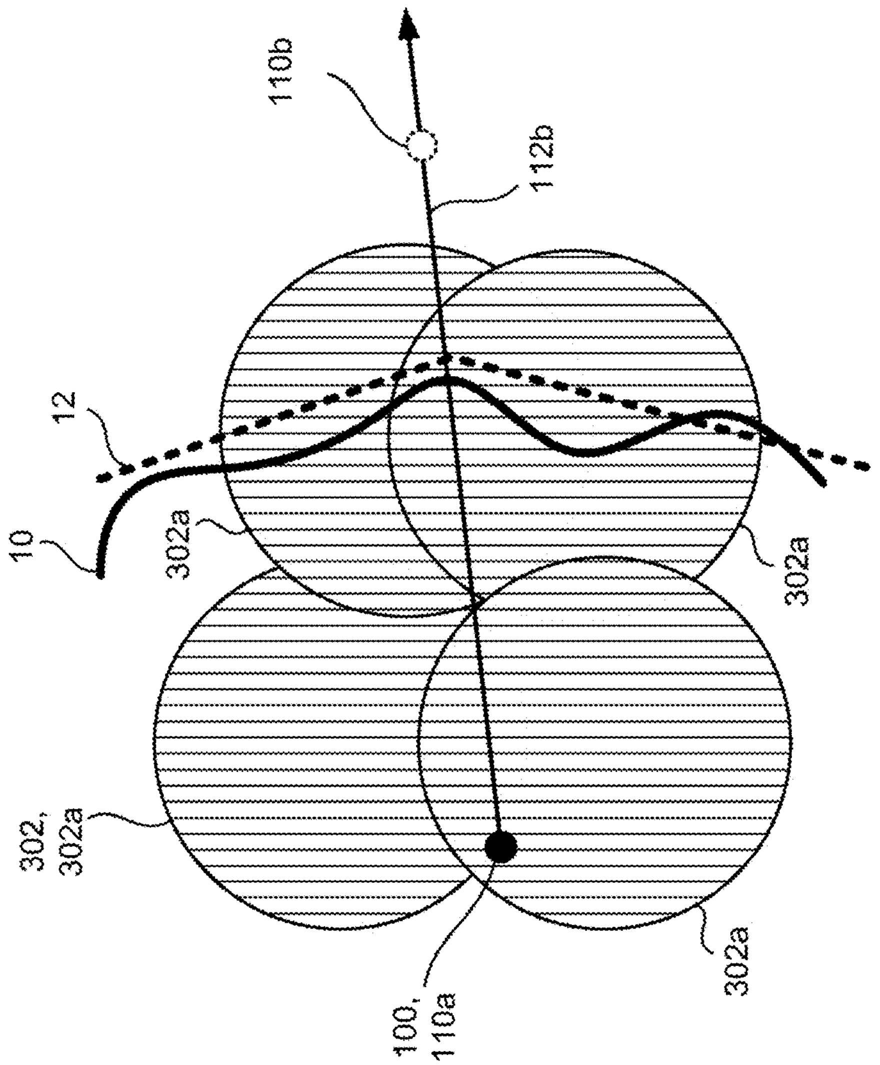
FIG. 3 is a schematic view of the user device geographically located within a first network coverage area of a first cellular network and approaching a geofence at or near a geographic boundary of the first network coverage area, where the communication protocols of the user device are not provisioned to enable roaming.

As shown in FIGS. 1 and 3, when the user device 100 is in the monitoring state and geographically located within a first network coverage area 302, 302*a* of a first cellular network 300, 300*a* that is identified on the authorized list 304 as an authorized cellular network 300A, a first wireless communication 101, 101*a* is transmitted from the user device 100 to the central system 200 via the first cellular network 300*a*. The first wireless communication 101*a* includes a first or current geographic location 110, 110*a* of the user device 100 so that the central system 200 tracks the user device 100 based on receiving the first wireless communication 101*a*. Further, the first wireless communication 101*a* may include sensor data 112 captured by the one or more sensors 106 at the user device 100. In the illustrated example of the vehicle 100, the first wireless communication 101*a* includes the current geographic location 110*a* of the vehicle 100 and captured sensor data 112, such as the velocity 112*a* of the vehicle 100 and the directional heading 112*b* of the vehicle 100.

As the user device 100 travels within the first network coverage area 302*a*, the user device 100 continues to wirelessly communicate with the central system 200 via the first cellular network 300 to enable tracking of the user device 100. For example, the communication module 102 transmits wireless communications to the central system 200 at regular intervals. Further, while the user device 100 and the central system 200 are communicatively connected via the first cellular network 300, the user device 100 is operable to receive operating instructions and/or system updates 201 from the central system 200. In the illustrated example of the vehicle 100, the vehicle 100 is operable to receive instructions 201 from the central system 200 such as to instruct the vehicle 100 to perform an emergency stop or other driving maneuver, to enable or disable operation of the engine or powertrain system of the vehicle 100, to enable or disable operation of the ignition system of the vehicle 100, to operate exterior lighting systems of the vehicle 100 (e.g., to flash headlights or emergency lights of the vehicle 100), to unlock or lock doors of the vehicle 100, and the like.

A boundary or limit of the first network coverage area 302*a* of the first cellular network 300*a* may generally correspond to a territorial boundary or border 10, such as an international or regional border (e.g., the border between the United States and Mexico), where the user device 100 loses connectivity to the first cellular network 300*a* when the user device 100 travels outside the boundary of the first network coverage area 302*a*. To avoid losing connectivity with the user device 100 when in the monitoring state, a geofence 12 is established at or near the boundary of the first network coverage area 302*a*, such as at or near the territorial boundary 10, so that the communication protocol of the user device 100 can be reprovisioned to enable roaming based on the user device 100 approaching or crossing the geofence 12. With roaming enabled at the user device 100, one or more forbidden networks 300F are recharacterized as authorized networks 300A so that the user device 100 may transmit wireless communications via the previously forbidden networks and maintain connectivity between the user device 100 and central system 200 on the other side of the territorial boundary 10, such as for tracking and recovery of the user device 100 and for receiving operational instructions 201 from the central system 200.

Figure 4:
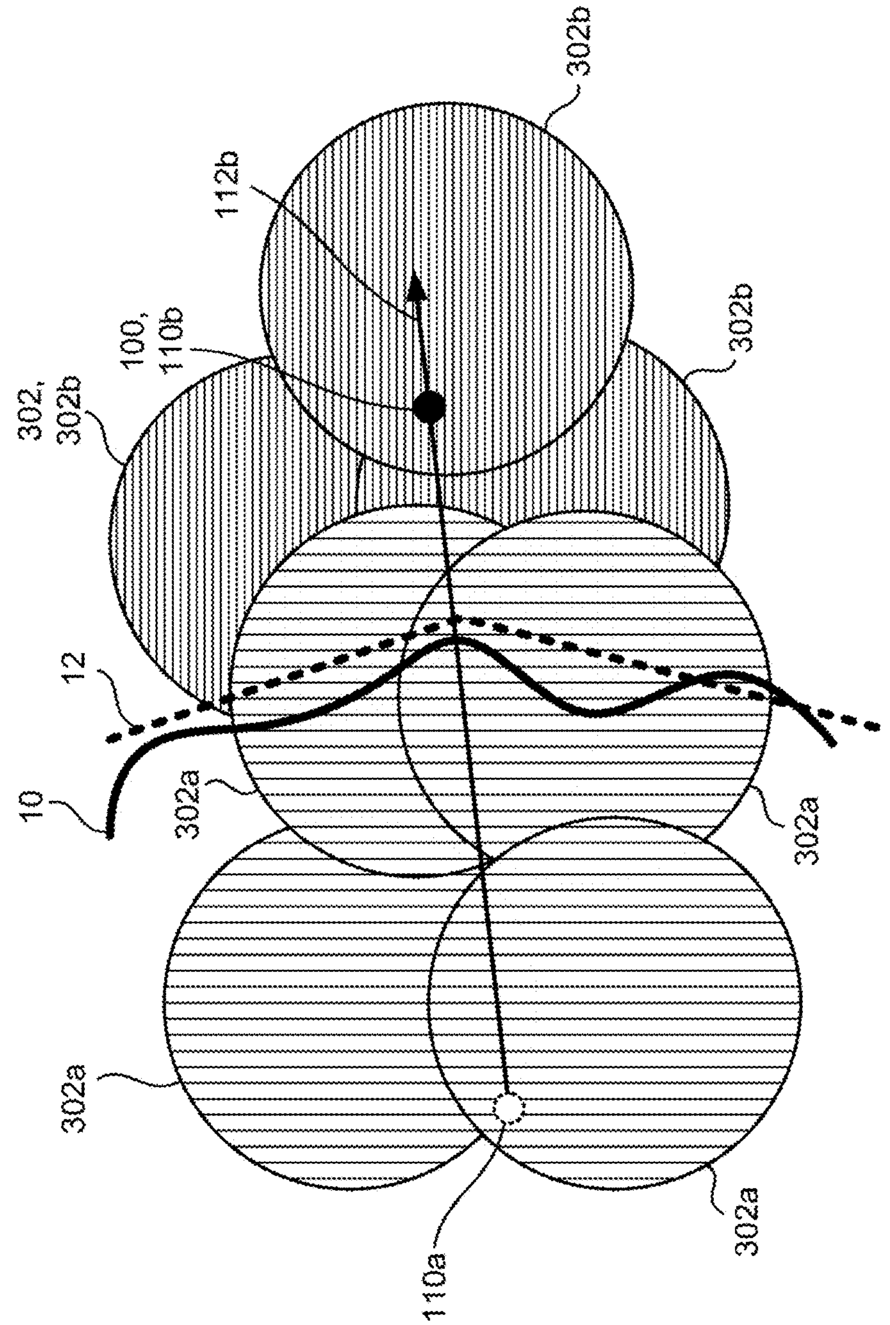
FIG. 4 is a schematic view of the user device geographically located within the first network coverage area of the first cellular network and approaching the geofence at or near a geographic boundary between the first network coverage area and a second network coverage area of a second cellular network, where the communication protocols of the user device are provisioned to enable roaming.

In the illustrated example, the geofence 12 is established as a geographic boundary along the territorial boundary 10 and between the first network coverage area 302*a* of the first cellular network 300*a* and the second network coverage area 302*b* of the second cellular network 300*b* (FIG. 4). With the second cellular network 300*b* identified on the forbidden list 306 as a forbidden cellular network 300F, the communication module 102 may not be able to transmit wireless communications via the second cellular network 300*b*. Thus, and as shown in FIG. 3, with the user device 100 at a second or updated geographic location 110*b* outside of the first network coverage area 302*a* and without another authorized cellular network 300A providing coverage at the second geographic location 110*b*, connectivity between the user device 100 and the central system 200 is lost.

To prepare the user device 100 to connect to the second cellular network 300*b*, the central system 200 determines, based on the first wireless communication 101*a*, that the user device 100 is approaching the geofence 12 and attempts to remove the second cellular network 300*b* from the forbidden list 306. For example, based on the first geographic location 110*a* and/or at least one of the velocity 112*a* of the user device 100, the directional heading 112*b* of the user device 100, and a distance or proximity of the user device 100 to the geofence 12, the central system 200 determines that the user device 100 is approaching the geofence 12.

In the illustrative example of the vehicle 100, the central system 200 determines that the vehicle 100 is approaching the geofence 12 when the vehicle 100 is within a threshold distance of the geofence 12, such as ten kilometers or less, five kilometers or less, one kilometer or less, and the like. Optionally, the vehicle 100 is determined to be approaching the geofence 12 based on an expected travel time between the vehicle 100 and the geofence 12, a sudden decrease in distance between the vehicle 100 and the geofence 12, and the like.

Based on determination that the user device 100 is approaching the geofence 12, the central system 200 executes the reprovisioning process by attempting to transmit the wireless communication or instruction or SIM update 201 to the user device 100 via the first cellular network 300*a*. The wireless communication 201 includes instructions for the user device 100 to reprovision the communication protocols of the user device to enable roaming, such as by updating the SIM 108 to remove the second cellular network 300*b* from the forbidden list 306. For example, the wireless communication 201 instructs the user device 100 to clear the forbidden list 306 and/or to add the forbidden cellular networks 300F to the authorized list 304 to characterize the cellular networks 300 as authorized cellular networks 300A. The central system 200 attempts to reprovision the communication protocol of the user device 100 with the user device located within the first network coverage area 302*a* of the first cellular network 300*a* (i.e., before the user device crosses geofence 12) so that the instruction 201 can be transmitted via the first cellular network 300*a* before the user device exits the first network coverage area 302*a*.

In other words, when the central system 200 determines that the user device 100 is approaching the geofence 12, the central system 200 performs an over-the-air (OTA) SIM update to clear the forbidden list 306 maintained by the SIM 108 of the user device 100. Executing the OTA SIM update while the user device 100 is connected to the first cellular network 300*a* allows the user device 100 to connect to the previously forbidden second cellular network 300*b* when the user device 100 exits the first network coverage area 302*a* of the first cellular network 300*a* and enters the second network coverage area 302*b* of the second cellular network 300*b*, thus allowing for more continuous tracking of the user device 100 and resulting in greater chance of recovery of the user device 100.

Figure 2:
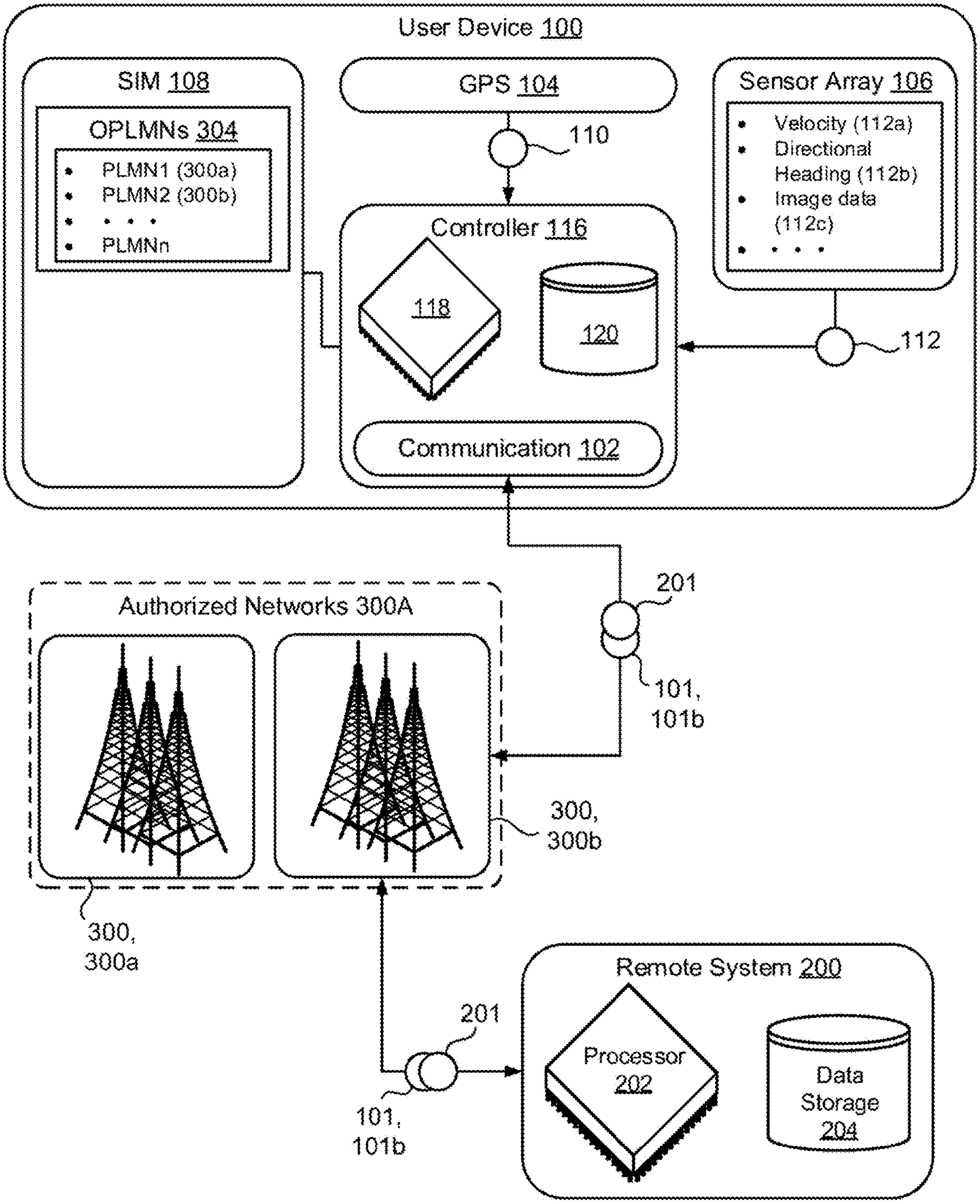
FIG. 2 is a schematic view of the user device wirelessly communicating with the central system via a second cellular network, where the communication protocols of the user device are provisioned to enable roaming.

Referring to FIGS. 2 and 4, with the user device 100 reprovisioned to enable roaming, the second cellular network 300*b* is removed from the forbidden list 306 and/or the forbidden list 306 is cleared from the SIM 108. Thus, the second cellular network 300*b* is identified as an authorized cellular network 300A and the user device 100 is able to connect to the second cellular network 300*b* and use the second cellular network 300*b* for wireless communications.

With roaming enabled at the user device 100 and based on the user device 100 crossing the territorial boundary 10, crossing the geofence 12, and/or entering the second network coverage area 302*b* of the second cellular network 300*b*, the user device 100 transmits a second wireless communication 101, 101*b* via the second cellular network 300*b* to the central system 200. The second wireless communication 101*b* includes the second or updated geographic location 110*b* of the user device 100 so that the central system 200 continues tracking the user device 100. Further, connection of the user device 100 and the central system 200 via the second cellular network 300*b* allows the central system 200 to transmit further operational instructions 201 to the user device 100. The user device 100 may adjust its operational parameters or perform a given function based on the operational instruction 201 received from the central system 200, such as performing an emergency procedure, enabling or disabling operation of the user device 100, performing an alarm or alert procedure, and the like.

Thus with the user device 100 in the monitoring state, the central system 200 tracks the geographic location 110 of the user device 100 via wireless communications 101 from the user device 100 to the central system 200. When the central system 200 determines that the user device 100 is approaching the geofence 12, the central system 200 adjusts the communication protocols of the user device 100 to enable roaming, such as by transmitting instructions 201 to the user device 100 to clear the forbidden list 306 maintained by the SIM 108. With roaming enabled, the user device 100 transmits further wireless communications 101 and the central system 200 continues tracking the geographic location 110 of the user device 100 in the monitoring state.

The monitoring state of the user device 100 may be based on a user activating the monitoring state (e.g., the user reports that the user device 100 has been stolen or is missing) and/or the central system 200 activating the monitoring state (e.g., a government authority issues an AMBER alert associated with the user device 100, or a valid warrant is issued allowing for tracking of the user device 100). Optionally, the monitoring state is pushed to the user device 100 based on satisfaction of a condition. In the illustrated example of the vehicle 100, the monitoring state is established based on identification of the vehicle 100 as a stolen vehicle by a crime database in communication with the central system 200, based on the vehicle 100 being operated without presence of a valid keyfob, based on an anti-theft device of the vehicle 100 being triggered, and the like.

Based on the monitoring state associated with the user device 100, the central system 200 establishes the geofence 12. In the illustrated example, the geofence 12 is established at or near the international border 10. However, it should be understood that the geofence 12 is a configurable value that may be established at any suitable geographic position for triggering the reprovisioning process. In some examples, the geofence 12 is established based on the boundary of the network coverage area 302 of authorized cellular networks 300A so that the reprovisioning process may be executed before the user device 100 travels outside the network coverage area 302 and is unable to connect to the authorized cellular network 300A for receiving reprovisioning instructions 201.

In some examples, the operations for the reprovisioning process are executed at the central system 200. For example, the central system 200 determines that the user device 100 is in the monitoring state and instructs the user device 100 to transmit the first wireless communication 101*a* that includes the current geographic location 110*a* of the user device 100 so that the central system 200 tracks the geographic location 110 of the user device 100. Further, the central system 200 establishes the geofence 12 between the first network coverage area 302*a* of the first cellular network 300*a* and the second network coverage area 302*b* of the second cellular network 300*b*. The central system 200 determines, based on the geographic location 110 of the user device 100, that the user device 100 is approaching the geofence 12. Moreover, determination that the user device 100 is approaching the geofence 12 is based on at least one of the velocity 112*a* of the user device 100, the directional heading 112*b* of the user device 100, and a distance between the user device 100 and the geofence 12. Based on determination that the user device 100 is approaching the geofence 12, the central system 200 attempts to enable roaming for the user device 100, such as by transmitting instructions 201 via the first cellular network 300*a* for the SIM 108 to clear the forbidden list 306. Thus, with roaming enabled (e.g., with the forbidden list 306 at the SIM 108 cleared), the user device 100 transmits the second wireless communication 101*b* that includes the second updated geographic location 110*b* of the user device 100.

In some circumstances, the central system 200 is unable to enable roaming for the user device 100 before the user device 100 crosses the geofence 12 or the territorial boundary 10 or the user device 100 enters the second network coverage area 302*b* of the second cellular network 300*b*. For example, the user device 100 receives the instruction 201 from the central system 200 instructing the user device 100 to clear the forbidden list 306, but updating the SIM 108 is still in progress as the user device 100 travels across the geofence 12 or territorial boundary 10 and into the second network coverage area 302*b* of the second cellular network 300*b*. In this example, the first network coverage area 302*a* and the second network coverage area 302*b* at least partially overlap (FIG. 4) and the user device 100 executes a dragging procedure, where the user device 100 transmits wireless communications that include the geographic location 110 of the user device 100 via the first cellular network 300*a* until the SIM 108 is updated to enable roaming or the user device 100 is out of range of the first cellular network 300*a*. The user device 100 may also execute the dragging procedure when travelling into the second network coverage area 302*b* before fully receiving the instruction 201 from the central system 200 so that the user device 100 remains connected to the first cellular network 300*a* for receiving the instruction 201 from the central system 200.

Moreover, if the user device 100 loses connection to the first cellular network 300*a* before the SIM 108 is updated to enable roaming, the user device 100 enters an accelerated scanning condition, where the communication module 102 attempts to reconnect to the first cellular network 300*a*, such as to finish receiving the instruction 201 and/or to transmit wireless communications 101 for tracking of the user device 100. Thus, if the user device 100 travels back into the first network coverage area 302*a*, the user device 100 will connect to the first cellular network 300*a* and complete the reprovisioning process. That is, with the second cellular network 300*b* identified on the forbidden list 306 and the user device 100 located within the second network coverage area 302*b* of the second network 300*b*, the user device 100 attempts to transmit wireless communications 101 via the first cellular network 300*a*.

Optionally, if the user device 100 loses connection to the first cellular network 300*a* before the SIM 108 is updated to enable roaming, the user device 100 attempts to connect to the second cellular network 300*b* to complete the reprovisioning process and/or transmit wireless communications 101 for tracking the user device 100. For example, the central system 200 transmits an instruction 201 to the second cellular network 300*b* for the second cellular network 300*b* to accept connection and wireless communications 101 from the user device 100. Thus, even if the SIM 108 at the user device 100 is not updated to identify the second cellular network 300*b* as an authorized cellular network 300A, the communication module 102 attempts to connect to the second cellular network 300*b*. In other words, with the second cellular network 300*b* identified on the forbidden list 306 and the user device 100 located within the second network coverage area 302*b* of the second network 300*b*, the user device 100 attempts to transmit wireless communications 101 via the second cellular network 300*b*.

When the user device 100 loses connection with a cellular network 300, the user device 100 may wait a threshold period of time before attempting to reconnect to the cellular network 300, such as to conserve battery or processing power while the user device 100 moves toward the coverage area 302 of the cellular network 300. Based on the user device 100 being in the monitoring state, the threshold period of time between reconnection attempts may be reduced or eliminated to more quickly reconnect to the cellular network 300. In other words, the user device 100 enters an accelerated scanning state where the user device 100 adjusts its standard time period between connection attempts (i.e., reduces or eliminates the threshold period between attempts) to more quickly connect to the cellular network 300. Put another way, attempting to reconnect to the cellular network 300 for transmitting wireless communications 101 includes a threshold waiting period between respective attempts to reconnect and transmit the wireless communication 101 via the cellular network 300. The threshold waiting period is reduced or eliminated based on the user device 100 being in the monitoring state. Thus, if the user device 100 loses connection to the first cellular network 300*a* before the SIM 108 is updated to enable roaming, the user device 100 attempts to connect to the first cellular network 300*a* and/or to the second cellular network 300*b* to complete the reprovisioning process and/or transmit wireless communications 101 for tracking the user device 100, and based on the user device 100 being in the monitoring state, the threshold waiting period between connection attempts is reduced or eliminated.

For example, the user device 100 when not in the monitoring state may be provisioned to include a threshold waiting period of two minutes between reconnection attempts in response to losing connection to the cellular network 300. Based on the user device 100 being in the monitoring state, the user device 100 may be provisioned to adjust the threshold waiting period to be 30 seconds, 15 seconds, 10 seconds, and the like or the user device 100 may be provisioned to eliminate the threshold waiting period.

In some examples, the operations for the reprovisioning process are executed at the user device 100. For example, the user device 100 determines the monitoring state (e.g., based on an anti-theft device at the user device 100, based on instruction 201 received from the central system 200, and the like) and transmits the first wireless communication 101*a* that includes the current geographic location 110*a* of the user device 100. When the user device 100 is in the monitoring state, the user device 100 is in a geofence-aware state, where the user device 100 determines that it is approaching the geofence 12 based on the current geographic location 110*a* of the user device 100. The geofence 12 may be stored in memory 120 at the user device 100 and/or determined based on instruction 201 received from the central system 200. Determination that the user device 100 is approaching the geofence 12 may be further based on at least one of the velocity 112*a* of the user device 100, the directional heading 112*b* of the user device 100, and a distance between the user device 100 and the geofence 12, as determined at the user device 100. Based on determination that the user device 100 is approaching the geofence 12, the user device 100 attempts to enable roaming, such as by instructing the SIM 108 to remove the second cellular network 300*b* from the forbidden list 306 or by instructing the SIM 108 to clear the forbidden list 306. Thus, with roaming enabled and the user device 100 located within the second network coverage area 302*b* of the second cellular network 300*b*, the user device 100 transmits the second wireless communication 101*b* that includes the second updated geographic location 110*b* of the user device 100.

Optionally, the central system 200 identifies the cellular networks 300 present on the authorized list 304 and the forbidden list 306. For example, based on customer agreements managed by the central system 200, the central system 200 instructs the SIM 108 to update the authorized list 304 and/or the forbidden list 306. Further, the central system 200 may identify different authorized cellular networks 300A and different forbidden cellular networks 300F for different user devices 100 managed by the central system 200. Thus, one cellular network 300 is characterized as an authorized cellular network 300A for one user device 100 and the one cellular network 300 is characterized as a forbidden cellular network 300F for another user device 100. This way, the authorized list 304 and the forbidden list 306 is specific to the SIM 108 at each user device 100 managed by the central system 200, allowing greater flexibility in communication protocols across user devices 100 managed by the central system 200.

Figure 5:
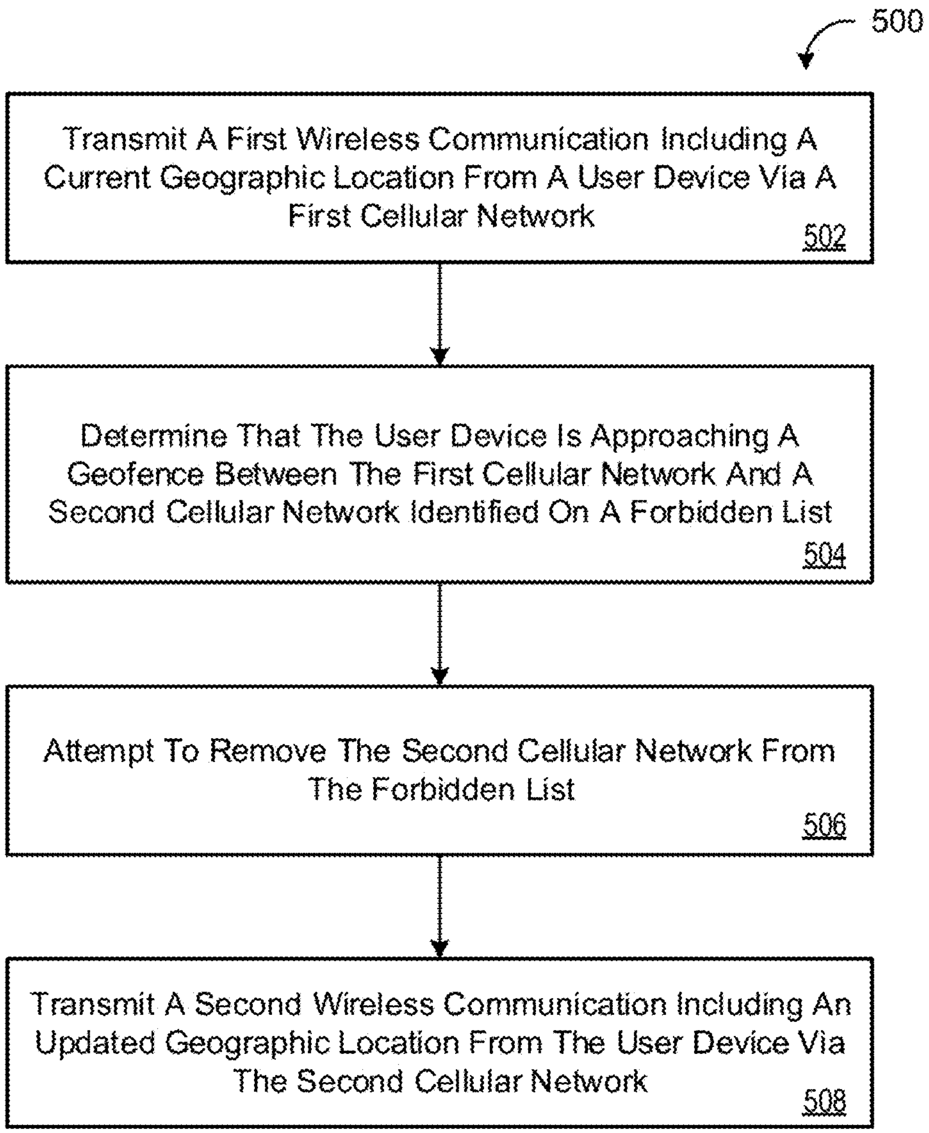
FIG. 5 is a flowchart of an example method for tracking a geographic location of a user device and reprovisioning the communication protocols of the user device to enable roaming.

FIG. 5 provides a flowchart for an example method 500 for tracking the geographic location 110 of the user device 100 and reprovisioning the communication protocols of the user device 100 to enable roaming. The central system 200 and/or the controller 116 at the user device 100 may perform operations for the method 500. At operation 502, the method 500 includes transmitting the first wireless communication 101*a* from the user device 100 via the first cellular network 300*a*. The first wireless communication 101*a* includes the current geographic location 110*a* of the user device 100. The first cellular network 300*a* is identified as an authorized cellular network 300A that the user device 100 is authorized to use for wireless communications. The SIM 108 associated with the user device 100 maintains the forbidden list 306 identifying forbidden cellular networks 300F that the user device 100 is not authorized to use for wireless communications. At operation 504, the method 500 includes determining that the user device 100 is approaching the geofence 12 based on the current geographic location 110*a* of the user device 100. The geofence 12 includes a geographic boundary established at least partially between the first network coverage area 302*a* of the first cellular network 300*a* and the second network coverage area 302*b* of the second cellular network 300*b*, where the second cellular network 300*b* is identified on the forbidden list 306 as a forbidden cellular network 300F that the user device 100 is not currently authorized to use for wireless communication. At operation 506, and based on determination that the user device 100 is approaching the geofence 12, the method 500 includes attempting to remove the second cellular network 300*b* from the forbidden list 306. For example, the user device 100 is instructed to update the SIM 108 to clear cellular networks 300 from the forbidden list 306. At operation 508, the method 500 includes transmitting the second wireless communication 101*b* from the user device 100 via the second cellular network 300*b*. The second wireless communication 101*b* includes the updated geographic location 110*b* of the user device 100. Further, the second wireless communication 101*b* is transmitted with the second cellular network 300*b* removed from the forbidden list 306 and based on the user device 100 entering the second network coverage area 302*b* of the second cellular network 300*b*.

Figure 6:
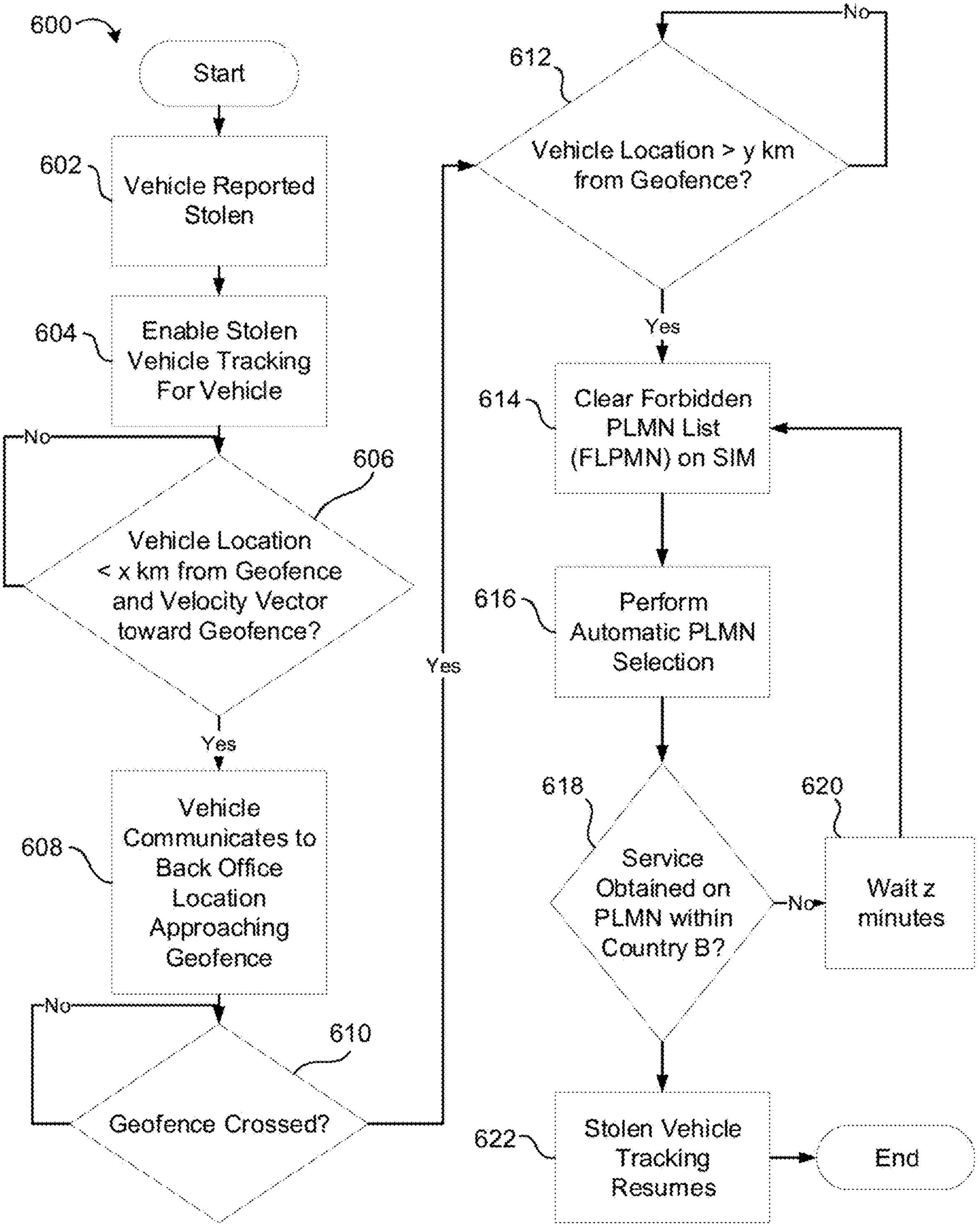
FIG. 6 is a flowchart of another example method for tracking the geographic location of a user device and reprovisioning the communication protocols of the user device to enable roaming.

FIG. 6 provides a flowchart for another example method 600 for tracking the geographic location 110 of the user device 100 and reprovisioning the communication protocols of the user device 100 to enable roaming. The central system 200 and/or the controller 116 at the user device 100 may perform operations for the method 600. In the illustrated example, the method 600 includes operations for tracking the geographic location 110 of the vehicle 100 and reprovisioning the SIM 108 at the vehicle 100. At operation 602, the method 600 includes reporting the vehicle 100 as stolen and entering the theft or monitoring state. At operation 604, the method 600 includes enabling tracking of the stolen vehicle 100, such as by transmitting instruction 201 from the central system 200 to the vehicle 100 to prompt transmission of the wireless communication 101 including the geographic location 110 of the vehicle 100. At operation 606, the method 600 includes determining that the vehicle 100 is approaching the geofence 12. In the illustrated example, the vehicle 100 is determined to be approaching the geofence 12 when the geographic location 110 of the vehicle 100 is less than a threshold distance from the geofence 12 and the directional heading 112*b* of the vehicle 100 is generally directed toward the geofence 12. Operation 606 is an iterative loop and thus the vehicle 100 continues transmitting wireless communications 101 including the geographic location 110 of the vehicle at least until the vehicle 100 is determined to be approaching the geofence 12. At operation 608, and based on determination that the vehicle 100 is approaching the geofence 12, the method 600 includes transmitting a wireless communication 101 from the vehicle 100 to the central system 200 indicating that the vehicle 100 is approaching the geofence 12, such as to prompt transmission of instructions 201 from the central system 200 for updating the SIM 108 to enable roaming. At operation 610, the method 600 includes determining that the vehicle 100 has crossed the geofence 12. At operation 612, the method 600 includes determining that the vehicle 100 is greater than a threshold distance beyond the geofence 12. Based on determining that the vehicle 100 is greater than the threshold distance beyond the geofence 12, the method 600 includes at operation 614 clearing the forbidden list 306 on the SIM 108. At operation 616, the method 600 includes performing automatic selection of a cellular network 300, where because the previously forbidden second cellular network 300*b* is no longer identified as a forbidden cellular network 300B, the vehicle 100 should connect to the second cellular network 300*b*. At operation 618, the method 600 includes determining whether connection has been made between the vehicle 100 and the second cellular network 300*b*. If the vehicle 100 does not wirelessly connect to the second cellular network 300*b*, operation 620 institutes a waiting period of a threshold number of minutes or seconds before repeating operation 614 and operation 616. The threshold waiting period may be reduced from a standard waiting period based on the vehicle 100 being in the tracking or monitoring state. If the vehicle 100 does wirelessly connect to the second cellular network 300*b*, the method 600 includes at operation 622 transmitting the second wireless communication 101*b* from the vehicle 100 to continue tracking the geographic location 110 of the vehicle 100.

Figure 7:
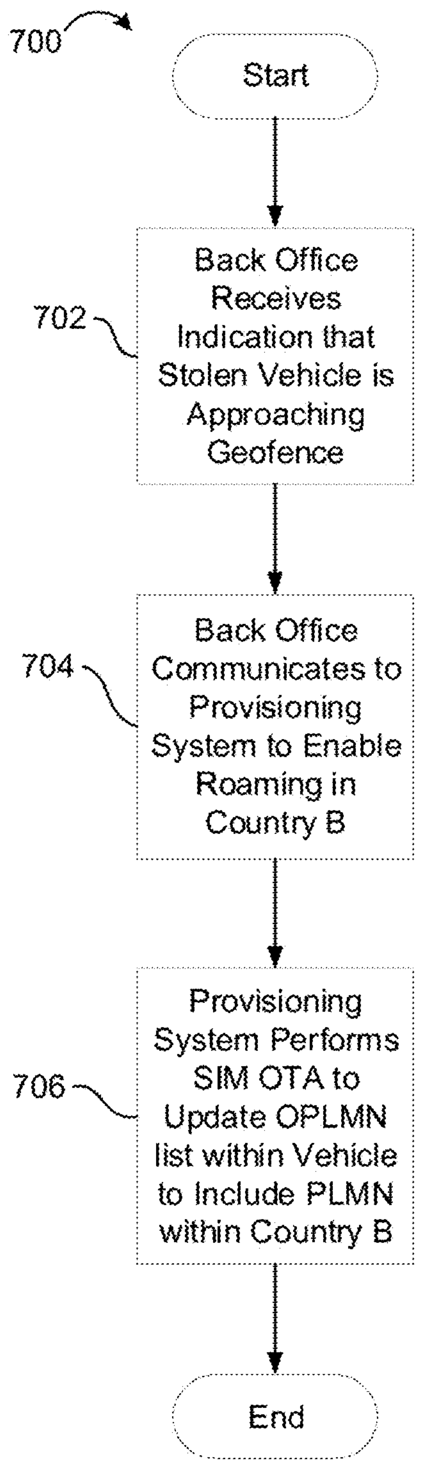
FIG. 7 is a flowchart of another example method for reprovisioning the communication protocols of the user device to enable roaming.

FIG. 7 provides a flowchart for another example method 700 for reprovisioning the communication protocols of the user device 100 to enable roaming. The central system 200 may perform operations for the method 700. In the illustrated example, the method 700 includes operations for reprovisioning the SIM 108 at the vehicle 100. At operation 702, the method 700 includes receiving indication at the central system 200 that the vehicle 100 is approaching the geofence 12. For example, the controller 116 at the vehicle 100 determines that the vehicle 100 is approaching the geofence 12 based on the geographic location 110 of the vehicle 100 and the controller 116 transmits the wireless communication 101 to the central system 200 to inform the central system 200 that the vehicle 100 is approaching the geofence 12. At operation 704, the method 700 includes transmitting instruction 201 from the central system 200 to enable roaming for the vehicle 100. In the illustrated example, the instruction 201 is transmitted from the central system 200 to the user device 100 to instruct the user device 100 to update the SIM 108 to clear the forbidden list 306. At operation 706, the method 700 includes performing the OTA SIM update to update the authorized list 304 maintained at the SIM 108 of the vehicle 100 to include the second cellular network 300*b*.

Thus, when the vehicle 100 is in a theft state, the controller 116 and/or central system 200 enters a geofence-aware state, where the controller 116 and/or central system 200 automates the reprovisioning process to allow roaming and connection to previously forbidden cellular networks 300F. The controller 116 and/or central system 200 establishes a geofence 12 between authorized cellular networks 300A and forbidden cellular networks 300F. The controller 116 and/or central system 200 uses distance from the geofence 12 and directional heading 112*b* to determine where to begin the handoff process. When the vehicle 100 approaches the geofence 12 (e.g., determined using GPS position, velocity vector, proximity to the geofence, and the like), the controller 116 and/or central system 200 preemptively initiates a back office call and begins the reprovisioning and SIM update process to allow roaming in previously non-roaming territories. If the controller 116 and/or central system 200 is unable to reprovision and update the SIM 108 before the vehicle 100 crosses the geofence 12, the controller 116 and/or central system 200 initiates a dragging procedure, retaining connection to the authorized cellular network 300A for as long as possible. If the vehicle 100 is no longer able to retain the connection to the authorized cellular network 300A, the controller 116 and/or central system 200 enters an accelerated scanning condition, where the vehicle 100 scans for the authorized cellular network 300A and connects to it. From there, the controller 116 and/or central system 200 completes the reprovisioning and SIM update. If the vehicle 100 is a certain distance away from the geofence 12 and away from the authorized cellular network 300A, and the controller 116 and/or central system 200 was unable to reprovision the SIM 108 at the vehicle 100 in time (i.e., the stolen vehicle was driven deep into non-roaming territory too quickly), the controller 116 and/or central system 200 allows the vehicle 100 to attempt to connect to forbidden cellular networks 300F.

Reprovisioning communication protocols at stolen vehicles to enable roaming results in better tracking of stolen vehicles and greater chance of vehicle recovery. Preemptively initiating the reprovisioning process allows the SIM update to occur while the vehicle still has cellular connectivity. Further, because the reprovisioning process is automated based on the theft state or monitoring state of the vehicle and parameters of the vehicle relative to coverage areas of forbidden cellular networks, roaming is enabled in selective vehicles, resulting in cost savings from reduced usage of roaming networks and flexibility in the roaming policy across multiple user devices or vehicles managed by the central system.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method executed by data processing hardware that causes the data processing hardware to perform operations comprising:

transmitting a first wireless communication from a user device via a first cellular network, the first wireless communication including a current geographic location of the user device, the first cellular network comprising an authorized cellular network that the user device is authorized to use for wireless communications, and the user device maintaining a forbidden list identifying one or more cellular networks that the user device is not authorized to use for wireless communications;

determining, based on the current geographic location of the user device, that the user device is approaching a geofence, the geofence comprising a geographic boundary between a first network coverage area of the first cellular network and a second network coverage area of a second cellular network, the second cellular network identified on the forbidden list;

based on the determination that the user device is approaching the geofence, removing the second cellular network from the forbidden list; and with the second cellular network removed from the forbidden list and based on the user device entering the second network coverage area, transmitting a second wireless communication from the user device via the second cellular network, the second wireless communication including an updated geographic location of the user device.

2. The method of claim 1, wherein the operations further comprise, with the second cellular network removed from the forbidden list, receiving an operational instruction at the user device, the operational instruction transmitted to the user device from a central system remote from the user device via the second cellular network, an operational parameter of the user device adjusted based on the operational instruction.

3. The method of claim 1, wherein removing the second cellular network from the forbidden list comprises transmitting instructions from a central system via the first cellular network for the user device to clear the forbidden list, the central system remote from the user device.

4. The method of claim 1, wherein the operations further comprise, with the second cellular network identified on the forbidden list and based on the user device entering the second network coverage area, attempting to transmit the second wireless communication from the user device via at least one of the group consisting of the first cellular network and the second cellular network.

5. The method of claim 4, wherein attempting to transmit the second wireless communication from the user device comprises a threshold waiting period between respective attempts to transmit the second wireless communication, the threshold waiting period reduced based on a tracking state associated with the user device.

6. The method of claim 1, wherein determining that the user device is approaching the geofence is further based on at least one selected from the group consisting of:

a distance between the user device and the geofence;

a directional heading of the user device; and a velocity of the user device.

7. The method of claim 1, wherein the user device comprises a vehicle.

8. A system, the system comprising:

data processing hardware; and memory hardware in communication with the data processing hardware, the memory hardware storing instructions executed on the data processing hardware that cause the data processing hardware to perform operations comprising:

transmitting a first wireless communication from a user device via a first cellular network, the first wireless communication including a current geographic location of the user device, the first cellular network comprising an authorized cellular network that the user device is authorized to use for wireless communications, and the user device maintaining a forbidden list identifying one or more cellular networks that the user device is not authorized to use for wireless communications;

determining, based on the current geographic location of the user device, that the user device is approaching a geofence, the geofence comprising a geographic boundary between a first network coverage area of the first cellular network and a second network coverage area of a second cellular network, the second cellular network identified on the forbidden list;

based on determination that the user device is approaching the geofence, removing the second cellular network from the forbidden list; and with the second cellular network removed from the forbidden list and based on the user device entering the second network coverage area, transmitting a second wireless communication from the user device via the second cellular network, the second wireless communication including an updated geographic location of the user device.

9. The system of claim 8, wherein the operations further comprise, with the second cellular network removed from the forbidden list, receiving an operational instruction at the user device, the operational instruction transmitted to the user device from a central system remote from the user device via the second cellular network, an operational parameter of the user device adjusted based on the operational instruction.

10. The system of claim 8, wherein removing the second cellular network from the forbidden list comprises transmitting instructions from a central system via the first cellular network for the user device to clear the forbidden list, the central system remote from the user device.

11. The system of claim 8, wherein the operations further comprise, with the second cellular network identified on the forbidden list and based on the user device entering the second network coverage area, attempting to transmit the second wireless communication from the user device via at least one of the group consisting of the first cellular network and the second cellular network.

12. The system of claim 11, wherein attempting to transmit the second wireless communication from the user device comprises a threshold waiting period between respective attempts to transmit the second wireless communication, the threshold waiting period reduced based on a tracking state associated with the user device.

13. The system of claim 8, wherein determining that the user device is approaching the geofence is further based on at least one selected from the group consisting of:

a distance between the user device and the geofence;

a directional heading of the user device; and a velocity of the user device.

14. The system of claim 8, wherein the user device comprises a vehicle.

15. A vehicle, the vehicle comprising:

data processing hardware; and memory hardware in communication with the data processing hardware, the memory hardware storing instructions executed on the data processing hardware that cause the data processing hardware to perform operations comprising:

transmitting a first wireless communication from the vehicle via a first cellular network, the first wireless communication including a current geographic location of the vehicle, the first cellular network comprising an authorized cellular network that the vehicle is authorized to use for wireless communications, and the vehicle maintaining a forbidden list identifying one or more cellular networks that the vehicle is not authorized to use for wireless communications;

determining, based on the current geographic location of the vehicle, that the vehicle is approaching a geofence, the geofence comprising a geographic boundary between a first network coverage area of the first cellular network and a second network coverage area of a second cellular network, the second cellular network identified on the forbidden list;

based on determination that the vehicle is approaching the geofence, removing the second cellular network from the forbidden list; and with the second cellular network removed from the forbidden list and based on the vehicle entering the second network coverage area, transmitting a second wireless communication from the vehicle via the second cellular network, the second wireless communication including an updated geographic location of the vehicle.

16. The vehicle of claim 15, wherein the operations further comprise, with the second cellular network removed from the forbidden list, receiving an operational instruction at the vehicle, the operational instruction transmitted to the vehicle from a central system remote from the vehicle via the second cellular network, an operational parameter of the vehicle adjusted based on the operational instruction.

17. The vehicle of claim 15, wherein removing the second cellular network from the forbidden list comprises transmitting instructions from a central system via the first cellular network for the vehicle to clear the forbidden list, the central system remote from the vehicle.

18. The vehicle of claim 15, wherein the operations further comprise, with the second cellular network identified on the forbidden list and based on the vehicle entering the second network coverage area, attempting to transmit the second wireless communication from the vehicle via at least one of the group consisting of the first cellular network and the second cellular network.

19. The vehicle of claim 18, wherein attempting to transmit the second wireless communication from the vehicle comprises a threshold waiting period between respective attempts to transmit the second wireless communication, the threshold waiting period reduced based on a tracking state associated with the vehicle.

20. The vehicle of claim 15, wherein determining that the vehicle is approaching the geofence is further based on at least one selected from the group consisting of:

a distance between the vehicle and the geofence;

a directional heading of the vehicle; and a velocity of the vehicle.

* * * * *